United States Patent [19]

Purton

[11] 4,295,487
[45] Oct. 20, 1981

[54] CLEANOUT APPARATUS FOR FLOW CONTROL VALVES

[75] Inventor: Robert M. Purton, Cerritos, Calif.

[73] Assignee: Dresser Industries, Inc., Dallas, Tex.

[21] Appl. No.: 90,232

[22] Filed: Nov. 1, 1979

[51] Int. Cl.³ .............. F16K 51/00; F16K 47/00
[52] U.S. Cl. .................. 137/242; 15/256.5; 137/625.3; 251/127; 251/249.5
[58] Field of Search ......... 15/256.5; 137/242, 245.5, 137/625.28, 625.3; 138/42; 251/127, 205, 249.5

[56] References Cited
U.S. PATENT DOCUMENTS

| | | | |
|---|---|---|---|
| 2,087,533 | 7/1957 | Youker | 137/245.5 |
| 2,131,936 | 10/1938 | Genovese | 137/242 |
| 3,467,128 | 9/1969 | Johnston | 137/242 |
| 3,513,864 | 5/1970 | Self | 137/625.28 |
| 3,514,074 | 5/1970 | Self | 137/625.28 |
| 3,529,628 | 9/1970 | Cummins | 137/625.3 |
| 3,780,767 | 12/1973 | Borg et al. | 137/625.3 |
| 3,894,716 | 7/1975 | Barb | 137/625.3 |
| 3,921,668 | 11/1975 | Self | 137/625.3 |
| 3,995,664 | 12/1976 | Nelson | 138/42 |
| 4,004,613 | 1/1977 | Purton et al. | 138/42 |

Primary Examiner—Martin P. Schwadron
Assistant Examiner—G. L. Walton
Attorney, Agent, or Firm—Roy L. Van Winkle

[57] ABSTRACT

The apparatus described herein is for use in a valve including a hollow valve body having inlet and outlet passageways extending into the body and a valve member positioned in the body for movement between open and closed positions. A plurality of orifice members are disposed between the inlet and outlet so that fluid flowing through the valve must pass therethrough. The orifice members are arranged to restrict fluid flow and thus reduce the pressure as the fluid flows through the valve. The orifice members are also arranged so that the inlet to each series of members is through an annular space that is narrower than the smallest of the orifices so that any particle passing through the annular space will pass through the valve. Each inlet is provided with a cleaning member that projects therein and the orifice members are rotatable in the valve body so that the cleaning members pass through each inlet.

5 Claims, 3 Drawing Figures

CLEANOUT APPARATUS FOR FLOW CONTROL VALVES

BACKGROUND OF THE INVENTION

This invention relates generally to improvements in fluid control valves. More particularly, but not by way of limitation, this invention relates to cleaning apparatus for fluid pressure control valves. In control valves of the type described in detail hereinafter, it is desirable to reduce the pressure fluid flowing therethrough from a very high pressure to some lesser pressure and to dissipate the energy thus released in such a manner that liquids will not be vaporized nor will extremely high velocities be developed that will result in either erosion of the valve or downstream apparatus or that will result in unacceptable high noise levels as the pressure is reduced. Some examples of designs which have been proposed to accomplish the foregoing are illustrated by U.S. Pat. Nos. 3,513,864 issued May 26, 1972 to R. E. Self; 3,514,074 issued May 26, 1972 to R. E. Self; 3,529,628 issued Sept. 22, 1972 to S. A. Cummins; 3,690,344 issued Sept. 12, 1972 to Richard S. Brumm; and 4,004,613 issued Jan. 25, 1977 to Robert M. Purton and Robert B. Maddock.

Each of the foregoing describes a valve that has been designed for the purpose of reducing the pressure of fluid flowing therethrough. Each of foregoing is provided with a plurality of stacked, annular members disposed between the inlet and outlet of the valve and through which fluid must flow. Each, with the exception of U.S. Pat. No. 3,690,344, has arranged the stacked annular members in such a manner that fluid flowing through the valve must follow a very tortuous path through a plurality of orifice like openings as it passes through the valve to dissipate the energy that is released as the pressure is reduced.

In the U.S. Pat. No. 3,690,344, a plurality of stacked plates are provided, but the flow path therethrough is generally in a straight line. The energy is dissipated due to the restriction provided by the narrow spaces between the stacked plates.

Again, with the exception of the U.S. Pat. Nos. 3,690,344 and 4,004,613, it will be appreciated that the annular members that are utilized to form the flow path through the valves are of extremely complex configuration and are of such construction that the orifices can become plugged. None of the valves include built in cleanout apparatus capable of removing the cause of the plugging.

An object of this invention is to provide cleanout apparatus for an improved flow control valve having orifice plates that provide a relatively long, tortuous flow path for dissipation of the energy and at the same time, prevent flow therethrough of any particles that would be of sufficient size to block the flow path and in which the first openings into the orifice plates can be quickly and easily cleaned in place in the event they should become plugged or flow therethrough unduly restricted.

The foregoing and additional objects and advantages of the invention will be more fully understood when the following detailed description is read in conjunction with the accompanying drawing.

DETAILED DESCRIPTION OF THE PREFERRED EMBODIMENT

Figure 2:
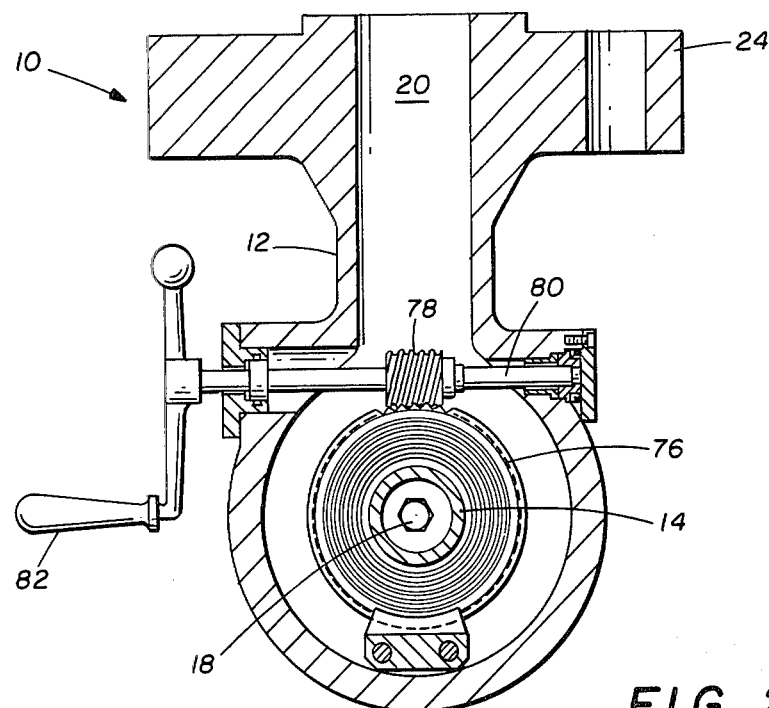
FIG. 2 is a cross-sectional view taken generally along the line 2—2 of FIG. 1.

Referring to the drawing, shown therein and generally designated by the reference character 10, is a flow control valve. The valve 10 includes a valve body 12 that is generally T-shaped in configuration, an elongated valve member 14 movably positioned within the hollow body 12, and valve operating means 16 that extends into the valve body 12 and is connected to the valve member 14 by the threaded fastener 18 (See FIG. 2).

The valve body 12 is provided with an inlet passageway 20 extending into one side of the valve body 12 and an outlet passageway 22 that extends through one end of the valve body 12. An inlet flange 24 is connected with the valve body 12 in fluid communication with the inlet passageway 20 and an outlet flange 26 is connected with the valve body 12 in fluid communication with the outlet passageway 22. While the flanges 24 and 26 are illustrated, it will be apparent that any suitable means of providing for the connection of external piping (not shown) to the valve 10, may be utilized as desired.

Figure 1:
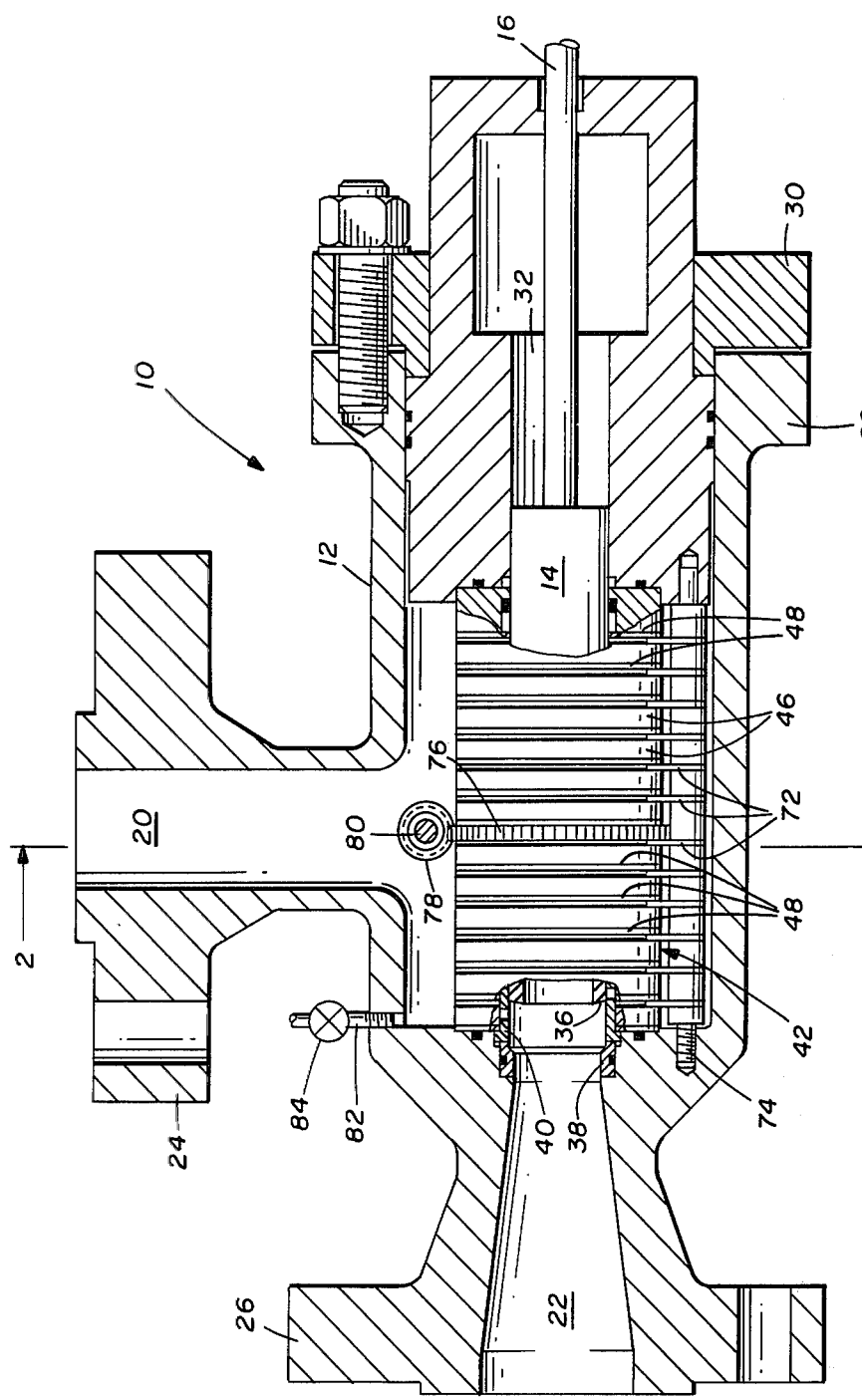
FIG. 1 is a cross-sectional view of a flow control valve that includes cleanout apparatus that is constructed in accordance with the invention.

As illustrated in FIG. 1, a flange connection 28 is provided to attach a cap 30 to the valve body 12. The cap 30 may be connected to the valve body 12 in any suitable manner, but it is provided with a cavity 32 that is sized to accommodate the valve member 14 during its travel within the valve body 12. The cap 30 also accommodates the valve operating means 16 as well as controls (not illustrated) for moving the valve member 14.

The valve member 14 is also provided with a beveled sealing surface 36 on one end thereof that is arranged to sealingly engage a complementary annular valve seat 38 that is located in the housing 12. While illustrated as being a separate member, the annular valve seat 38 may be constructed as an integral portion of the housing 12 if desired.

Encircling the valve member 14 is a perforated sleeve 40. Encircling the sleeve 40 is a flow control assembly that is designated by the reference character 42 and which may be seen in more detail in FIGS. 2 and 3. The flow control assembly 42 is disposed between the inlet and outlet passageways 20 and 22 in such a position that fluid flowing through the valve 10 must pass therethrough. The flow path through the flow control assembly 42 may be described as tortuous (See FIG. 3) and is arranged to provide a reduction in the pressure of fluid flowing through the valve 10.

Figure 3:
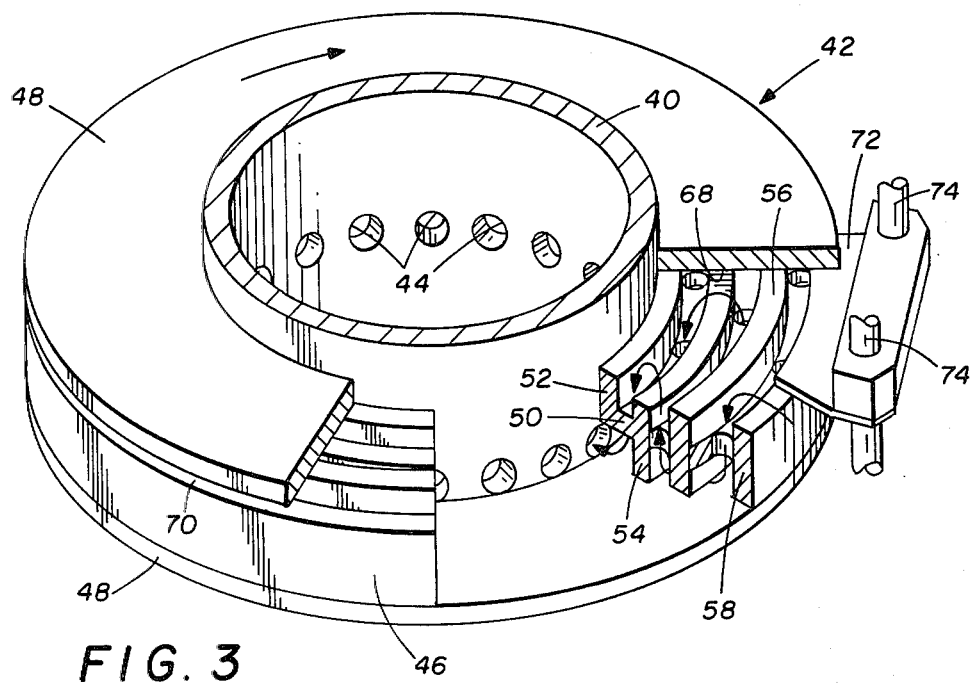
FIG. 3 is a pictorial view, partly in cross-section showing a portion of the valve and cleanout apparatus in more detail.

As shown most clearly in FIG. 3, the sleeve 40 includes a plurality of perforations 44 that extend through the sleeve 40. To provide the tortuous flow path through the flow control assembly 42, a plurality of annular orifice members 46 and annular disks 48 are located in alternate arrangements along the exterior of the sleeve 40. Preferably, the annular orifice members 46 are identical in construction to provide for ease in manufacture and are designed to be produced by standard machine shop equipment. Each of the orifice members 46 includes a central web portion 50 from which alternately directed and radially spaced annular lands 52, 54, 56, and 58 project. It will be noted that alternate lands, that is annular lands 52 and 56 extend relatively upwardly from the web portion 50 into engagement with one of the disks 48 located relatively above the orifice member 46. Similarly, alternate lands 54 and 58 extend downwardly from the web portion 50 into engagement with another of the disks 48 that is located relatively below the orifice member 46.

While the lands 52 and 56 do extend downwardly, they are shortened and do not engage the lower disk member 48, but define annular spaces or orifices which form a portion of the flow path through the valve 10. Similarly, annular lands 54 and 58 extend upwardly toward the disk member 48 located above the orifice member 46. However, they do not engage the disk 48, but define annular spaces or orifices 68 and 70 therewith.

In the web 50, and between the concentric annular lands, flow restricting orifices are provided so that the flow through the flow control assembly 42 is substantially as illustrated by the arrow in FIG. 3. Since the orifices are located in annular grooves defined by the lands, it is not necessary that the orifice members 46 be aligned in any particular manner since each orifice member 46 defines its own flow path through the valve 10.

It should be pointed out that the annular orifice 70, which is located between the outermost land 58 and the adjacent disk 48, is narrower than any of the other orifices described. Accordingly, the orifice 70 determines the size of particle that can enter the flow path through the valve 10. By constructing the orifice 70 narrower than any other orifice in the valve 10, no particle can pass into the flow path that will plug any of the other orifices. Furthermore, since the orifice 70 is annular in configuration, any particle will block only a minute portion of the orifice 70 and, due to the large total flow area of the orifice 70, will not severely restrict or plug the flow passageway through the particular orifice member 46 involved.

The number of orifice members 46 used, will depend on the capacity of the valve 10. A sufficient number of the orifice members 46 should be provided so that the flow area will be greater than the anticipated capacity so that the energy dissipated as the pressure drop occurs across the orifice members 46, will be dissipated over a relatively larger area thereby reducing the noise generated. Also, the number of concentric annular lands provided on each orifice member 46 can vary depending on the length of flow path desired to dissipate the energy. Again, the longer the flow path, the slower the pressure reduction and consequently the quieter the valve will be in operation.

With regard to manufacture of the valves, and particularly with respect to the orifice member 46, it should be pointed out that such members can be quickly and easily produced by such simple machines as a lathe and drill press. Manifestly, the orifice members 46, due to their simple configuration, could be cast and then drilled or cast with the orifices 74 formed during the casting operation if desired.

Referring again to FIG. 1, the stack of disks 48 forming the flow control assembly 42 are pressed on to the sleeve 40 and located within the body 12. Cleanout members 72 are arranged on a pair of rods 74 with one end of each member 72 projecting into an annular orifice 70. (See FIG. 3). The rods 74 prevent the member 72 from rotating in the body 12.

A gear 76 encircles the assembly 42 and is attached thereto so that the gear 76 and assembly 42 can be rotated as a unit. A worm gear 78 is mounted on a shaft 80 that extends through and is journaled by the body 12. An operating handle 82 is mounted on the shaft 80 on the outside of the body 12 and is used to rotate the shaft 80 and worm gear 78.

In the operation of valve 10, exterior piping (not shown) is connected to the inlet passageway 20 and the outlet passageway 22, and the valve member 14 is moved to a position off the valve seat 38, so that fluid flows through the valve 10 in the direction of the arrow as illustrated in FIG. 3. As the fluid enters the valve body 12, it passes first through the annular orifice 70 where any particles that might plug the valve 10 are screened out. The fluid then flows through the various orifices exiting through the perforations 44 in the sleeve 40. After flowing through the sleeve 40, the fluid enters the outlet passageway 22 for discharge from the valve 10.

In the event that the valve 10 becomes plugged or flow therethrough becomes restricted, the handle 82 can be rotated and, through the gears 76 and 78, cause the assembly 42 to rotate. When this occurs, the cleanout members 72 will traverse each annular orifice 70, dislodging any foreign matter that may be stuck therein. Such dislodged matter will drop to the bottom of the valve 10 and may be removed upon disassembly of the valve or by the use of a blow-down connection 82 and valve 84 that are shown in FIG. 1. Of course, the handle can be periodically rotated to prevent plugging of the orifices 70 if desired.

From the foregoing, it will be appreciated that the valve 10 as described herinbefore, provides means for controlling the dissipation of energy of fluid flowing therethrough in a quiet and efficient manner. Also, the valve as described includes cleanout apparatus that can be quickly and easily actuated to clear or maintain the orifices of the valve clear.

Having described but a single embodiment of the invention, it will also be understood that many changes and modifications can be made thereto without departing from the spirit and scope of the invention.

The embodiments of the invention in which an exclusive property or privilege is claimed are defined as follows:

1. Cleanout apparatus for a valve or the like that includes a hollow body having an inlet and an outlet, orifice means located in the body between the inlet and outlet, and a valve member operable to permit or prevent flow through the body and orifice means from the inlet to the outlet, said apparatus comprising:
   - a flow path through the orifice means including an annular orifice in the outer periphery of the orifice means;
   - a cleanout member mounted on the body and extending into a portion of said annular orifice; and,
   - means for rotating the orifice means whereby said cleanout member can traverse the full length of said annular orifice to dislodge any debri collected in said annular orifice.

2. The cleanout apparatus of claim 1 wherein said orifice means includes:
   an annular disk; and, an annular orifice member located adjacent to said disk, the orifice member having a tortuous flow path therethrough and having an outer land extending toward said disk forming said annular orifice with said annular disk.

3. The cleanout apparatus of claim 1 wherein said means for rotating the orifice means includes:
a first gear mounted on said orifice means;
a shaft rotatable in the body and extending partially therethrough;
shaft rotating means connected to said shaft on the exterior of said body; and,
a second gear on said shaft meshing with said first gear for rotating said orifice means relative to said cleanout member.

4. Cleanout apparatus for a valve or the like that includes a hollow body having an inlet and an outlet, orifice means located in the body between the inlet and outlet, and a valve member operable to permit or prevent flow through the body and orifice means from the inlet to the outlet, said apparatus comprising:
a flow path through the orifice means including an annular orifice in the outer periphery of the orifice means, said orifice means including an annular disk and an annular orifice member located adjacent to said disk, the orifice member having a tortuous flow path therethrough and having an outer land extending toward said disk forming said annular orifice with said annular disk;
a cleanout member mounted on the body extending into a portion of said annular orifice; and
means for rotating the orifice means including
a first gear mounted on said orifice means,
a shaft rotatable in the body and extending partially therethrough whereby said cleanout member can traverse the full length of said annular orifice to dislodge any debris collected in said annular orifice,
shaft rotating means connected to said shaft on the exterior of said body, and
a second gear on said shaft meshing with said first gear for rotating said orifice means relative to said cleanout member.

5. The cleanout apparatus of claim 4 and also including at least one additional annular orifice and having a cleanout member for each annular orifice.

* * * * *